INVENTORS
WILLIAM HAROLD SMITH,
RUDOLPH FROHNER, AND
ROY T. ADOLPHSON
BY
*Alfred W. Petchaft*

ATTORNEY

INVENTORS
WILLIAM HAROLD SMITH,
RUDOLPH FROHNER, AND
ROY T. ADOLPHSON

BY *Alfred W Petchaft*

ATTORNEY

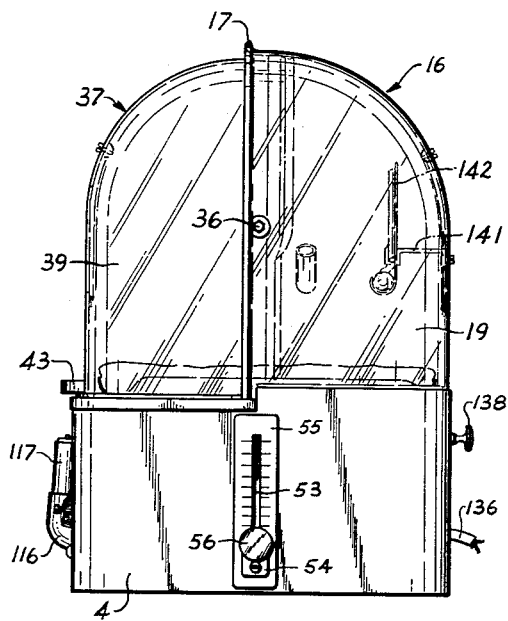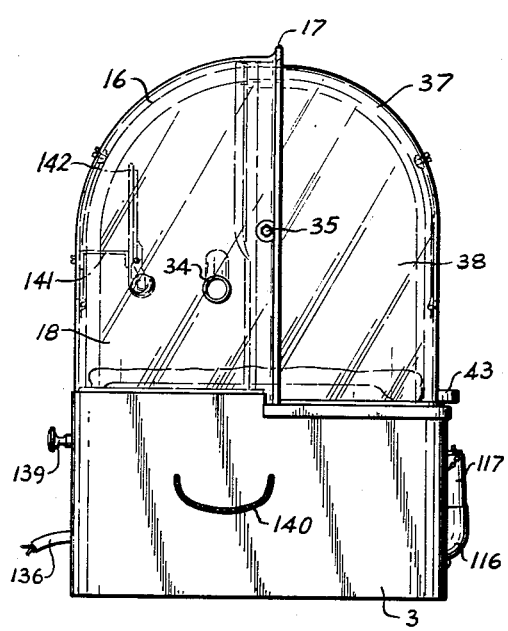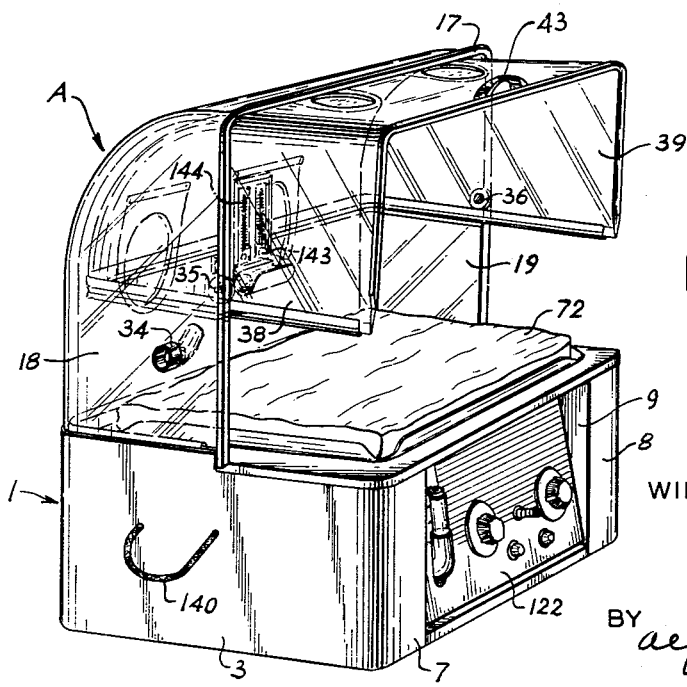

INVENTORS
WILLIAM HAROLD SMITH,
RUDOLPH FROHNER,
AND
ROY T. ADOLPHSON

BY *Alfred W. Petchaft*

ATTORNEY

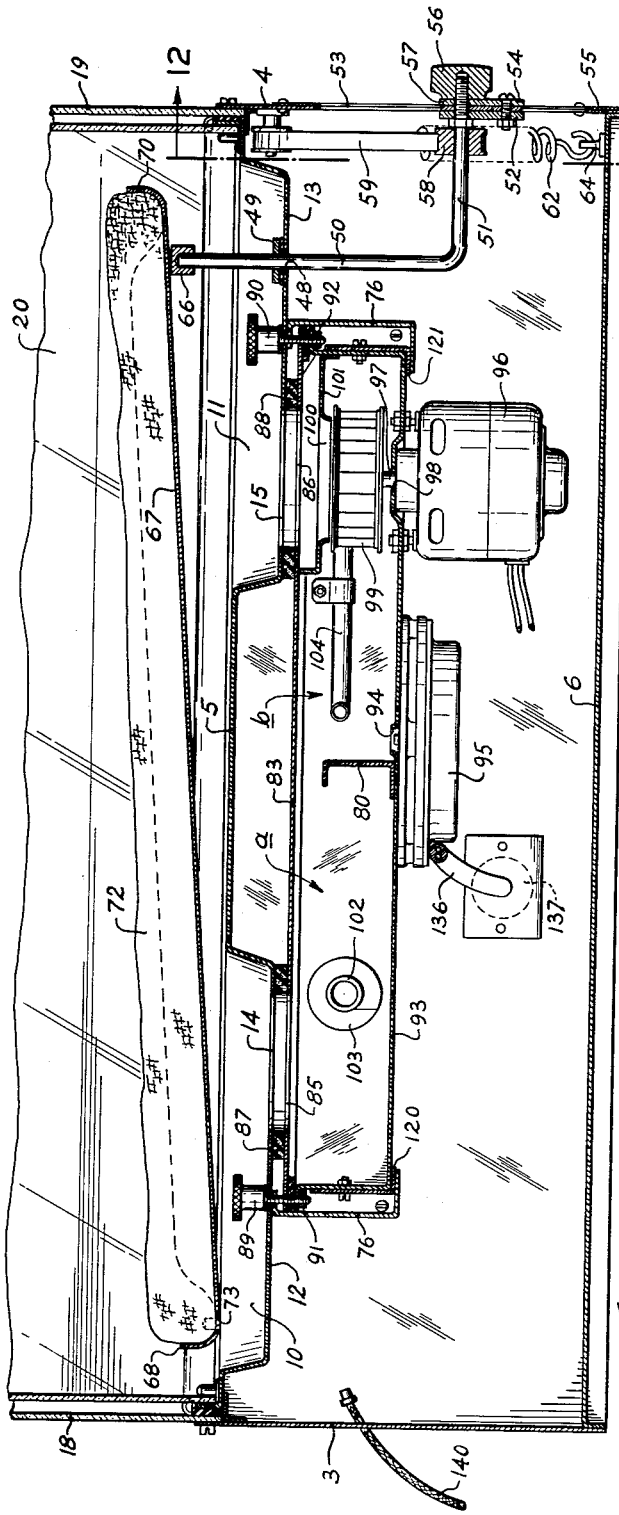

INVENTORS
WILLIAM HAROLD SMITH,
RUDOLPH FROHNER,
AND
ROY T. ADOLPHSON

BY *Alfred W Fetchaft*

ATTORNEY

Sept. 19, 1961 W. H. SMITH ET AL 3,000,376
INCUBATORS FOR INFANTS
Filed April 23, 1957 7 Sheets-Sheet 7

INVENTORS
WILLIAM HAROLD SMITH
RUDOLPH FROHNER
AND ROY T. ADOLPHSON

BY Alfred W. Petchaft
ATTORNEY

United States Patent Office 3,000,376
Patented Sept. 19, 1961

3,000,376
INCUBATORS FOR INFANTS
William Harold Smith and Rudolph Frohner, Norwalk, Conn., and Roy T. Adolphson, Webster Groves, Mo., assignors to O.E.M. Corporation, East Norwalk, Conn., a corporation of Connecticut
Filed Apr. 23, 1957, Ser. No. 654,503
3 Claims. (Cl. 128—1)

This invention relates in general to certain new and useful improvements in incubators for infants and, more particularly, to an incubator which is particularly adapted for the care and nurturing of prematurely born infants.

It has become a well-established obstetric and pediatric practice to place prematurely born infants in an incubator designed to enclose the infant within an atmosphere having precisely controlled conditions of temperature, humidity, and, when necessary, the proper degree of oxygen enrichment.

Particularly in view of recent medical research with respect to the effect of an oxygen-rich atmosphere upon eye tissue, it has become increasingly important to employ an incubator in which the oxygen-carbon dioxide balance and humidity within the incubator can be very precisely adjusted and controlled. In the case of premature infants, it is also occasionally necessary to deal, on an emergency basis, with such conditions as anaphylactic shock, pulmonary congestion, and similar conditions which require a so-called Trendelenberg position, that is to say, a position in which the infant's body can be inclined with the head and shoulders at a lower level than the feet and hips. Not only it is desirable to place the infant in a so-called Trendelenberg position, but it is also equally desirable that varying degrees of Trendelenberg inclination are available up to an angle of approximately 15°.

A further problem which has been encountered in infant incubators of present design relates to the physical handling of the infant. Many existing types of infant incubators are of box-like shape having hinged top-lids or hinged doors in a side wall. Such lids and doors are usually quite heavy and may accidentally drop down as the infant is being removed from or placed into the incubator. It is possible that the door, in accidentally dropping, may strike and injure the infant, or, as is more likely, strike and bruise the forearms of the nurse handling the infant. Closely related to this problem is the further problem of complete visibility. When a medical emergency occurs in the life of a premature infant, very often a matter of a few seconds in taking action can mean the difference between life and death. For this reason, it is considered highly essential that infant incubators afford a view of the infant which is as clear and unobstructed as possible while, at the same time, affording extremely quick and convenient physical accessibility to the infant.

Similarly, infant incubators must, of necessity, contain a variety of mechanical and electrical components which can fail during periods of use, no matter how carefully constructed and efficiently maintained. With existing and available types of incubators, the only thing which can be done when such mechanical failure occurs is to transfer the infant from the inoperative incubator to an incubator which is in working order. This, however, entails a certain amount of hazard, because premature infants are usually very delicate and sensitive for a number of weeks after birth and are highly susceptible to drafts, airborne infections and similar ills which can result from even a short period of exposure while being transferred from one incubator to another.

It is, therefore, one of the primary objects of the present invention to provide an infant incubator in which the conditions of temperature, pressure, and humidity can be precisely controlled.

It is another primary object of the present invention to provide an infant incubator in which the oxygen-concentration and oxygen-carbon dioxide balance can be precisely controlled and maintained.

It is another principal object of the present invention to provide an infant incubator which affords a clear and substantially unobstructed view of the infant from all sides, regardless of whether the incubator is closed or open, and also provides quick, simple, and convenient physical access to the infant.

It is a further object of the present invention to provide an infant incubator having hand ports and closures therefor which are substantially leak-proof and, at the same time, interpose virtually no interference with clear vision into the interior of the incubator.

It is also an object of the present invention to provide an infant incubator having hand ports of the type stated which will open under the slightest degree of physical pressure as the hand is inserted into the incubator and will automatically close in a substantially leak-proof manner as the hand is withdrawn.

It is an additional object of the present invention to provide an infant incubator which can be quickly and easily opened for inserting and removing the infant and for access to the infant in times of emergency.

It is likewise an object of the present invention to provide an incubator in which the infant can be easily, quickly, and conveniently disposed in a Trendelenberg position.

It is also an object of the present invention to provide an infant incubator having unique and novel means for filling and draining the water reservoir associated with the humidifying apparatus.

It is also an important object of the present invention to provide an infant incubator in which all of the mechanical and electrical components can be quickly removed or installed as a unit without disturbing the infant housed within the interior of the incubator.

With the above and other objects in view, our invention resides in the novel features of form, construction, arrangement, and combination of parts presently described and pointed out in the claims.

In the accompanying drawings—

FIGS. 5 and 6 are, respectively, end elevational views of the opposite transverse ends of the infant incubator;

FIG. 7 is a perspective view of the infant incubator in fully opened position;

FIG. 9 is a fragmentary sectional view taken along line 9—9 of FIG. 8;

FIG. 13 is a fragmentary sectional view taken along line 13—13 of FIG. 10;

FIG. 14 is a fragmentary sectional view similar to

Figure 15:
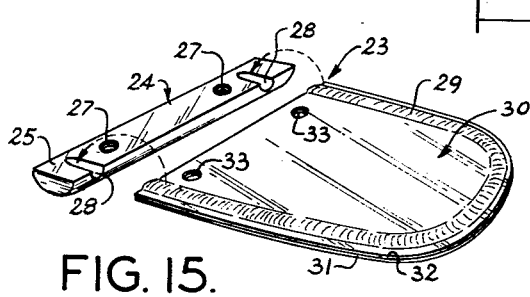
Figure 16:
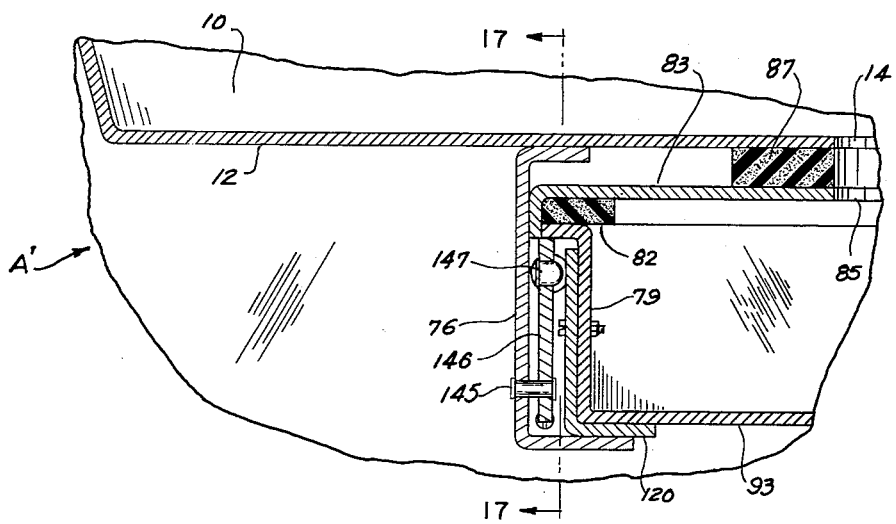
Figure 17:
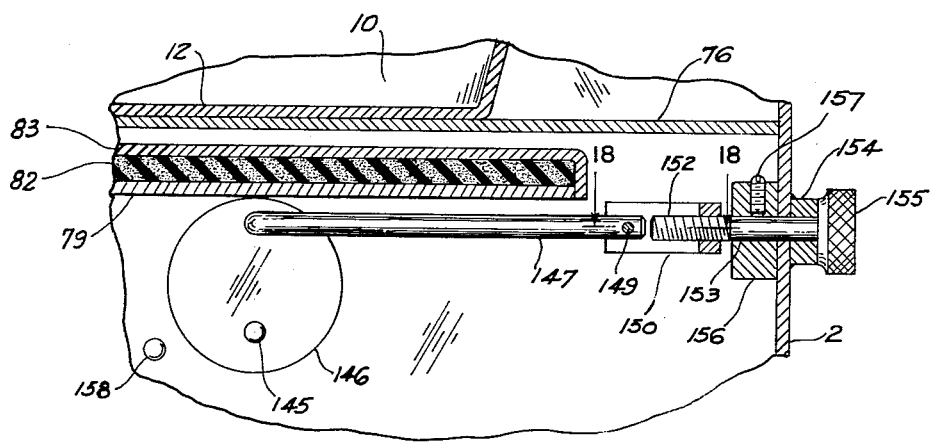

FIG. 13 showing the filling mechanism in downwardly turned position for draining the water reservoir;

FIG. 15 is an exploded view of the closure element forming a part of the present invention;

FIG. 16 is an enlarged fragmentary sectional view of a portion of FIG. 9 and showing a modified form of the invention;

FIG. 17 is a fragmentary sectional view taken along line 17—17 of FIG. 16; and

Figure 18:
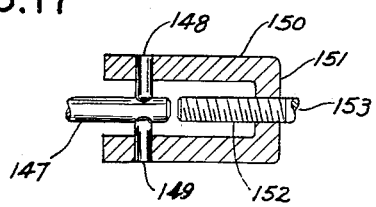

FIG. 18 is a fragmentary sectional view taken along line 18—18 of FIG. 17.

Referring now in more detail and by reference characters to the drawings, which illustrate practical embodiments of the present invention, A designates an infant incubator comprising a box-like rectilinear base housing 1 having a vertical rear wall 2, side walls 3, 4, horizontal top and bottom walls 5, 6, and a pair of relatively narrow front wall panels 7, 8, the inner vertical margins of which, in conjunction with the forward margins of the top and bottom walls 5, 6, form a forwardly presented rectangular drawer-opening 9.

The top wall 5 is provided along its longitudinal axis with two symmetrically arranged, somewhat oblong depressions 10, 11, having bottom walls 12, 13, respectively, which are, in turn, provided with air circulation apertures 14, 15.

Rigidly mounted around its lower peripheral margins upon the base housing 1 and extending upwardly over the rear half of the top wall 5 is a rear or stationary shell-life halfdome 16 formed of clear acrylic resin, Lucite, or other similar transparent material, and being provided around its forwardly presented vertical and horizontal margins with a narrow upturned flange 17. The halfdome 16 integrally includes vertical side walls 18, 19, and a back wall 20, the lower portion of which is substantially vertical and the upper portion of which is substantially quatri cylindrical. The back wall 20 of the halfdome 16 is provided with two circular apertures 21, 22, of sufficiently large diametral size to freely and loosely admit the passage of the hand, wrist, and forearm, of a nurse, doctor, or other adult attendant.

Figure 8:
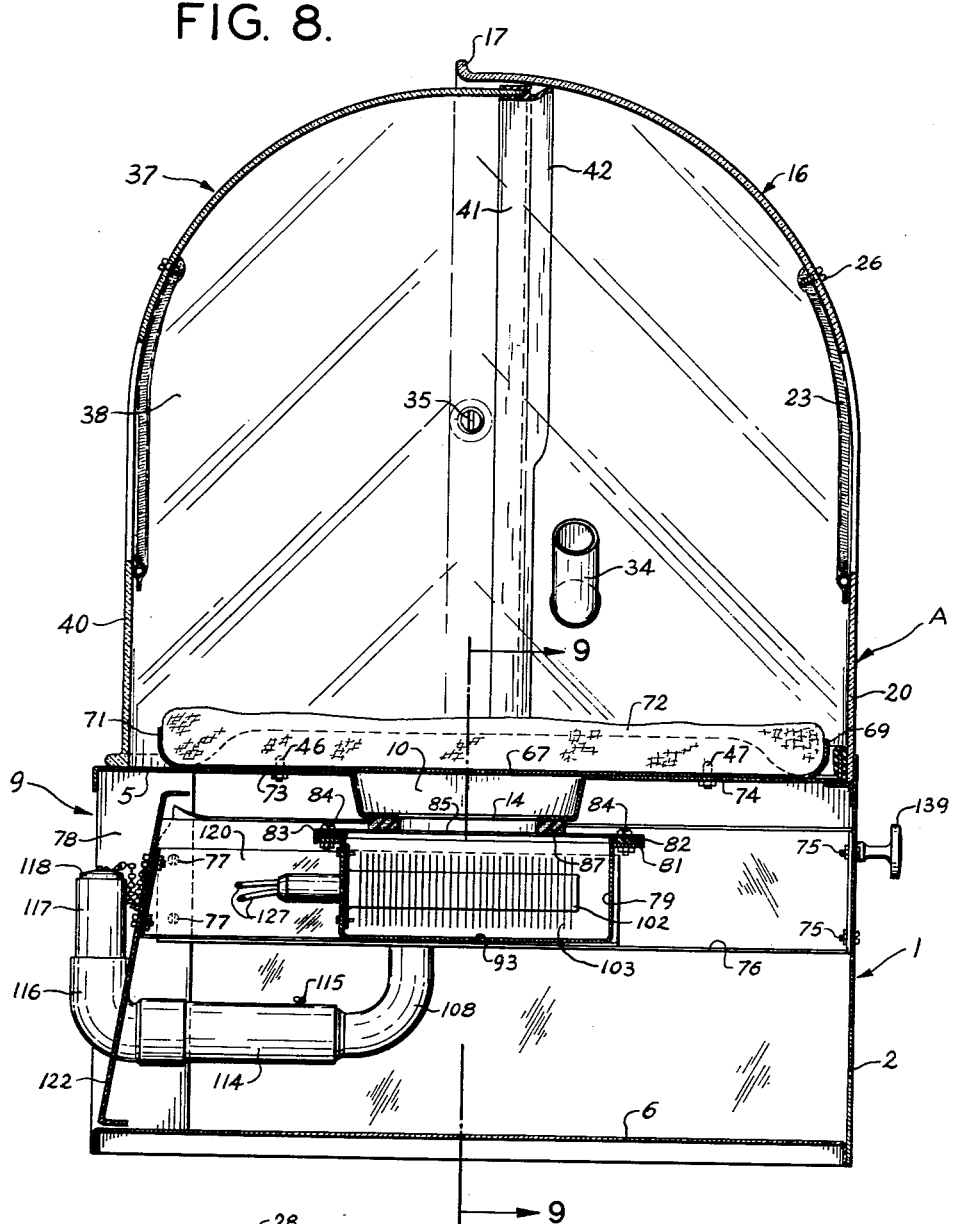
FIG. 8 is a vertical sectional view taken along line 8—8 of FIG. 2.

Provided for disposition across each of the apertures 21, 22, are flexible, transparent, glass-like closure elements 23, each comprising a mounting bar 24 formed preferably of clear Lucite or other similar synthetic plastic material and having a flat face 25 for snug-fitting disposition against the interior face of the halfdome 16, being adapted for securement thereto by means of small screws 26 which are threaded into internally threaded recesses 27. The mounting bar 24 is also provided on its flat face 25 with a pair of parallel recesses 28, which open upon the flat face 25 and also extend outwardly into the arcuate back face of the mounting bar 24 for snugly accommodating and retentively engaging the opposite ends of a U-shaped tightly-wound spiral spring 29, which is disposed within, and extends around the peripheral margins of, a flap-forming flat envelope 30 comprising two facewise overlying marginally bonded sheets 31, 32, of transparent Pliofilm or other similar material. When the plastic encased upper ends of the spring 29 are seated within the recesses 28, the intervening upper marginal portion of the flap-forming envelope 30 will lie in snug-fitting flat abutment across the flat face 25 of the bar 24 and is provided with apertures 33, for registration with the apertures 27. Thus, when the screws 26 are drawn up tightly, the bar 24 will hold the flap-forming envelope 30, together with the spring 29 encased therein, and, in turn, the spring 29 will be slightly flexed, as shown in FIG. 8, thereby holding the flap-forming envelope 30 in snug-fitting substantially leak-proof closure-forming position against the interior surfaces of the halfdome 16. The closure members 23 are extremely light in weight and can be readily pushed aside to admit the hand or arm of the attendant for purposes of administering to the needs of the infant in the incubator. However, the closure members 23 will immediately and effectively return to closure-forming position as soon as the hand or arm is withdrawn, thereby preventing any air leakage into or out of the incubator.

Also rigidly mounted in and extending through the side wall 18 of the halfdome 16 is a suitably bent piece of piping or tubing 34, which can be closed from the outside in any conventional manner, as, for instance, by means of a suitable cap or cork (the latter not being shown). The tubing 34 is actually not an essential part of the incubator, but is shown and optionally provided to permit the use of nebulizers and other therapeutic equipment which some doctors, upon occasion, use in handling certain types of incubator cases. These various types of nebulizers and related therapeutic devices form no part of the present invention and are, therefore, not shown or described herein.

At the approximate geometric center of the arc forming the top portion of the back wall 20, the side walls 18, 19, are provided with pivots 35, 36, respectively, for rockably supporting a companion-shaped halfdome 37 formed of transparent Lucite or similar material and being substantially similar in shape to the stationary halfdome 16, integrally including vertical side walls 38, 39, and a front wall 40. Around its rearwardly presented U-shaped peripheral lid, the halfdome 37 is provided with a flexible bead 41 formed preferably of neoprene or other oxygen-resistant rubber-like material and integrally including a rearwardly and upwardly presented flexible flange 42, which is in edgewise seated wiping contact with the inner faces of the rear halfdome 16. Consequently, when the front halfdome 37 is down in the closed position shown in FIG. 1, the interior of the incubator above the base housing 1 will be enclosed in a substantially leak-proof completely transparent dome. However, when desired, the front halfdome 37 can be swung upwardly to the position shown in FIG. 7 to afford complete access to the interior of the incubator. To facilitate the upward swinging movement of the halfdome 37, it is provided with a suitable handle 43. Furthermore, to provide convenient manipulative access to the interior of the incubator, the forward halfdome 37 is provided with two circular apertures 44, 45, which are substantially identical in shape and location to the apertures 21, 22, and are fitted with closure elements 23 in the same manner as the corresponding apertures 21, 22.

Figure 12:
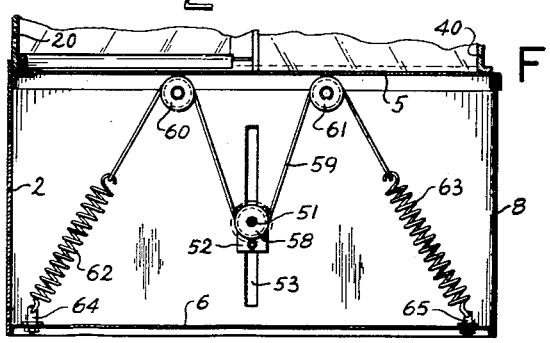
FIG. 12 is a fragmentary sectional view taken along line 12—12 of FIG. 9.

Along one transverse margin the top wall 5 is provided with two short upwardly projecting round-topped pins 46, 47, which are located symmetrically on opposite sides of the longitudinal center line of the top wall 5 in front-to-rear alignment, substantially as shown in FIGS. 8 and 9. Similarly, the bottom wall 13 of the recess 11 is provided with an aperture 48 and a grommet plate 49 for slidably accommodating a vertical rod 50, which extends downwardly therethrough and is bent at its lower end in the provision of a horizontal leg 51, which projects through, and is held rigidly in, a slide-fitting 52 operatively mounted in a slot 53 formed in the side wall 4 of the base housing 1. Externally of the side wall 4, the slide-fitting 52 is provided with a somewhat loose clamping plate 54 which can be shifted inwardly into tight clampwise abutment against the outwardly presented face of a reinforcing plate 55 which is riveted upon the outer face of the side wall 4 in marginal registration with the slot 53. The outwardly projecting end of the horizontal leg 51 is threaded for operatively supporting a knurled knob 56 having an inwardly presented flat face 57 which bears against the plate 54 and forces it into clamping position when desired. Inwardly of the slide-fitting 52, the horizontal leg 51 of the rod 50 is provided with a freely rotating nylon collar 58 which functions somewhat in the manner of a pulley and bears against a steel ribbon 59 which is similarly trained around pulleys 60, 61, and, at its opposite ends, is hooked into angularly disposed tension springs 62, 63, which are, in turn, hooked at their lower ends to post-like spring retention fittings 64, 65, rigidly mounted in the bottom wall 6, all as best seen in FIG. 12. The strength of the springs 62, 63, is such that the rod 50 will be normally biased upwardly with a force of approximately 15 to 20 lbs., so that the rod 50 and its related structure can be manually pushed downwardly to the lower limit of its travel in the slot 53 with a relatively small amount of manual force and can be locked in any position of vertical adjustment within the slot 53 by a simple manipulation of the knob 56.

At its upper end, the rod 50 is rigidly provided with a bar-shaped cross-member 66 which is more or less parallel to the transverse edges of the top wall 5 and bears upon the under face of a flat shallow pan-like tray 67 which is provided with four narrow upturned marginal flanges 68, 69, 70, 71, for retentive engagement with the peripheral edges of a mattress or pad 72, upon which the infant may rest. Inwardly from the flange 68, the tray 67 is provided with two suitably spaced apertures 73, 74, for removable disposition upon the pins 46, 47. The tray 67 can, therefore, be lifted upwardly and outwardly for removal from the incubator and can be readily replaced in a similar manner. When desired, the rod 50 can be elevated to any desired position between the limits of its travel within the slot 53 and the tray 67 thereby shifted into any desired angular position, as shown in FIG. 9. As shown in the drawings, the tray can be elevated from the horizontal position to an extreme angular position of approximately 16°, such extreme position being sufficient for all recognized pediatric purposes, but it will, of course, be understood that an even greater angle of inclination can be obtained by varying the dimensions of the above-described structural elements.

Rigidly secured to the rear wall 2 by means of bolts 75 are U-shaped slide-channels 76, which extend horizontally forwardly and, at their forward ends, are secured by means of bolts 77 to inturned vertical flanges 78 formed integrally with the front wall 8 and facing laterally upon the opening 9 in the base housing 1. Provided for slidable disposition upon the channels 76 is a drawer-like rectangular pan 79 which extends transversely across the interior of the base housing 1 between the channels 76 and beneath the openings 14, 15, in the top wall 5 thereof. The pan 79 is transversely divided approximately midway of its length by a short upstanding partition wall 80, which does not extend to the full height of the pan 79 and, therefore, permits the flow of air and vapor from one end to the other of the pan 79, but, nevertheless, divides the pan into two substantially separate compartments a, b. The pan 79 is finally provided around its entire peripheral margin with a flat rectangular flange 81, which supports a continuous gasket 82 and a closure-forming lid 83, which is tightly secured by bolts 84. The lid 83 is, furthermore, provided at its opposite ends with two apertures 85, 86, which are in vertical alignment with, and lie directly beneath, the apertures 14, 15, respectively, and cemented or otherwise suitably secured upon the top face of the lid 83 in concentric relation around the apertures 85, 86, are sealing gaskets 87, 88, respectively, which serve to seal the space between the apertures 14, 85, and 15, 86, so that the air drawn out of the interior of the incubator beneath the plastic half-domes 16, 37, through the openings 15, 86, will pass directly into the pan 79 and will, in turn, be returned thereto through the openings 14, 85, back into the interior of the incubator without leakage to the interior of the base housing 1. The pan 79 is held in tightly gasketed position beneath the top wall 5 by means of thumb screws 89, 90, which extend downwardly through suitable apertures formed in the bottom walls 12, 13, of the recesses 10, 11, and are threadedly engaged in nuts 91, 92, respectively, which are welded, soldered, or otherwise rigidly attached to the under faces of lateral portions of the pan flange 81. The bottom wall 93 of the pan 79 is provided with an aperture 94 opening into compartment b and communicating with this aperture is an oxygen control valve 95 which is rigidly mounted in any conventional manner upon the under side of the bottom wall 93. This oxygen control valve 95 is substantially shown and described in United States Patent No. 2,687,741, and is, therefore, not specifically described in detail herein.

Also bolted or otherwise conventionally mounted upon, and depending from, the bottom wall 93 of the pan 79, is an electric motor 96, a drive shaft 97 which projects vertically upwardly through a suitable clearance aperture 98 in the bottom wall 93 and is, at its upper end, operatively provided with a squirrel-cage type vaned rotor or impeller 99. The motor shaft 97 is positioned so as to be substantially concentric with the openings 15, 86, and draws air axially downwardly through a flanged opening 100 formed in a small rectangular baffle-wall 101 seated across the top portion of the compartment b between the upper rim of the blower or impeller 99 and the opening 86. The baffle-wall 101 is, furthermore, flanged upwardly around its peripheral margins to engage the under face of the lid 83 in order to prevent by-passing of air.

Figure 10:
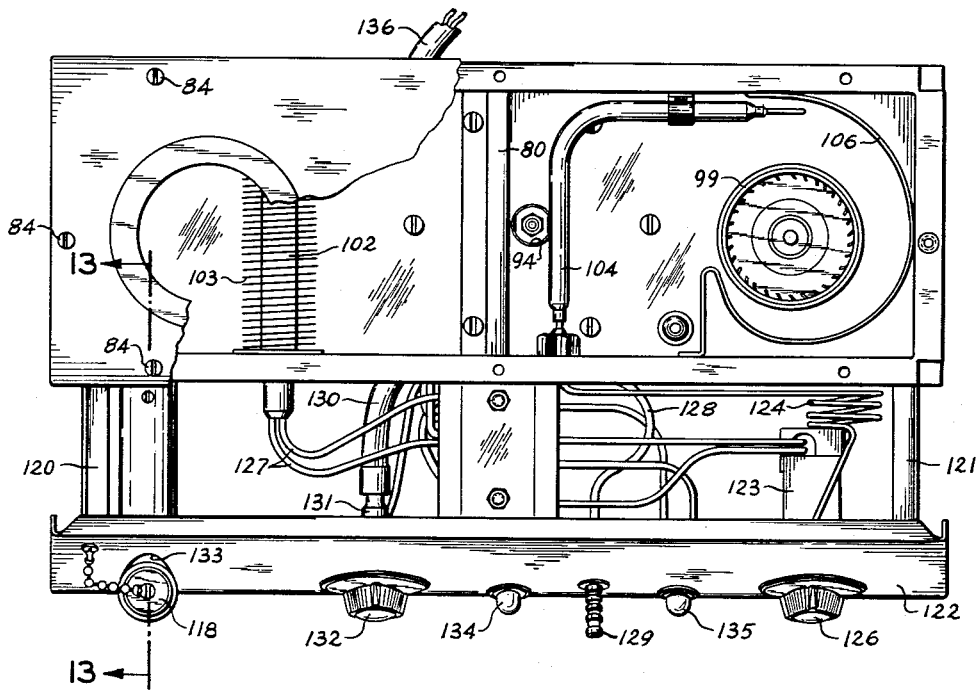
FIG. 10 is a top plan view, partly broken away and in section, of the mechanical-electrical assembly unit forming a part of the present invention.
Figure 11:
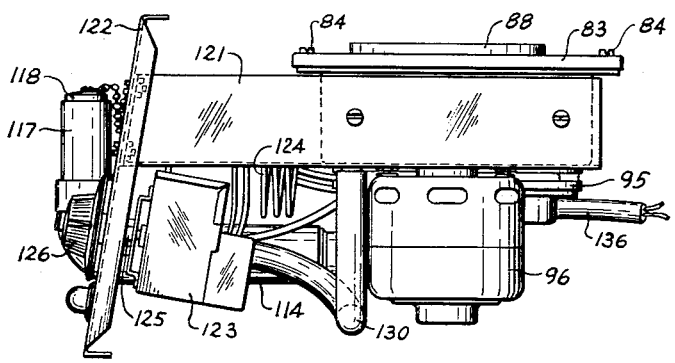
FIG. 11 is a side elevational view of the mechanical-electrical assembly unit forming a part of the present invention.

Mounted in the pan 79 and extending horizontally across the compartment a is an electric heater 102 of substantially tubular design and being provided with a plurality of closely spaced thin annular heat-dissipating fins 103. As will be seen by reference to FIG. 8, the heater 102 and fins 103 extend vertically upwardly and downwardly across the compartment a for practically the full height thereof, the fins 103 terminating a short distance above the bottom wall 93 and just below the level of the lid 83. Also mounted in the pan 79 is a thermostatic tube 104, which effectively spans the compartment b and senses the temperature of air passing therethrough. The compartment b is finally provided with a whorl-forming wall 106 mounted encirclingly about the impeller 99, substantially in the manner shown in FIG. 10, so that the impeller 99 will draw the air efficiently downwardly through the openings 15, 86, across the top of the compartment a and then upwardly and outwardly again through the openings 14, 85.

Rigidly mounted upon the under face of the wall 93 and sealed thereto by means of a gasket 107 is a pipe elbow 108 which opens at its upper end into the bottom of the compartment a and its lower end is provided with a forwardly projecting horizontal sleeve 109 which is integrally provided with axially spaced external rings 110, 111, which are respectively provided with annular packing rings 112, 113. Slidably and rotatably mounted upon the packing rings 112, 113, and extending in telescoped disposition around the tube 109 is a tubular piece of pipe 114 provided at its rear end with a stop-screw 115 and at its forward end with an elbow 116, which is, in turn, provided with a plastic tubular element 117 having a tightly fitted, but, nevertheless, removable, closure-cap 118, all as best seen in FIG. 13.

Figure 1:
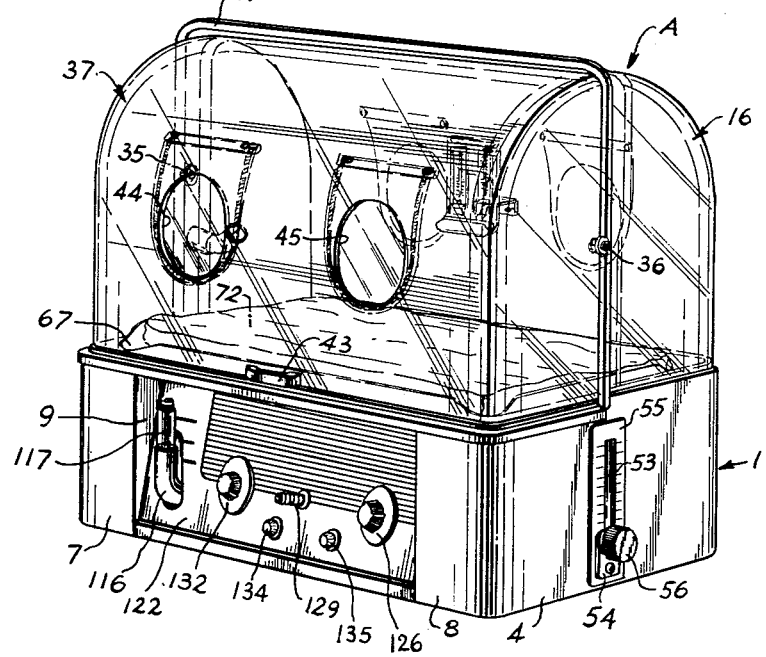
FIG. 1 is a perspective view of an infant incubator constructed in accordance with and embodying the present invention.
Figure 2:
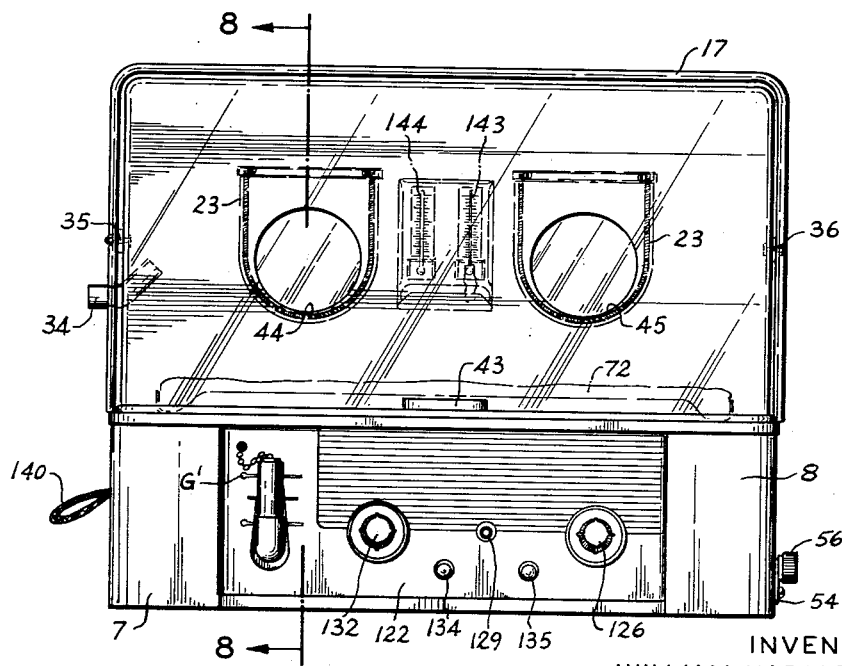
FIG. 2 is a front elevational view of the infant incubator.
Figure 3:
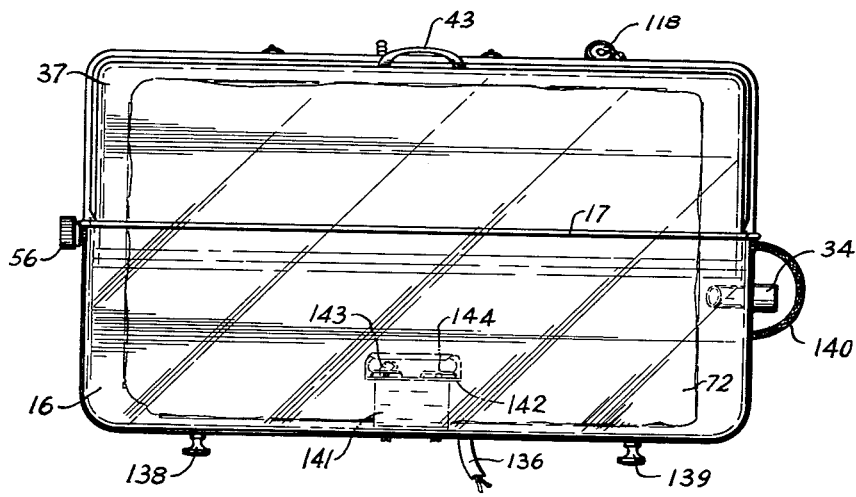
FIG. 3 is a top plan view of the infant incubator.
Figure 4:
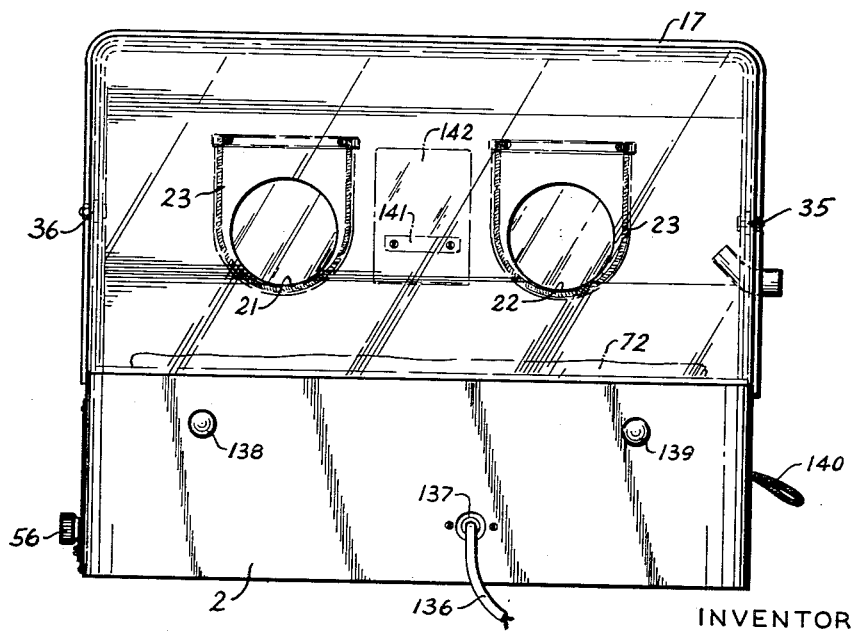
FIG. 4 is a rear elevational view of the infant incubator.

Bolted or otherwise rigidly secured to the lateral faces of the pan 79 are forwardly extending L-shaped channels 120, 121, which project forwardly beyond the pan 79 and are angularly cut off at their forward ends for supportive engagement with an inclined instrument panel 122 located for snug-fitting closurewise disposition across the opening 9 of the base housing 1, substantially as shown in FIGS. 1 and 7. Operatively mounted on the instrument panel 122 is a conventional thermostatic control 123 which is connected in the usual manner by means of a coil of copper tubing 124 to the thermostatic tube 104. The thermostatic control 123 has a shaft 125 which projects forwardly through the instrument panel 122 and is provided, on its external end, with a control knob 126. The electric heater 102 is also connected by conductors 127 to the thermostatic control element 123 in the usual and conventional manner so that the heater element 102 will go on and off intermittently responsive to temperature variations of the air passing through compartment b as sensed by the thermostatic tube 104. The oxygen control valve 95 is connected by means of a suitable tubular conduit 128 to a supply-line fitting 129 mounted in the instrument panel 122. The oxygen control valve 95 is also connected by a flexible tube 130 to a metering valve 131 mounted on the instrument panel 122 and controlled by a dial 132 located upon the outwardly presented face of said instrument panel 122. Finally, the instrument panel 122 is provided with a suitable clearance aperture 133 which loosely encircles the elbow 116 and leaves the latter free for manipulative purposes as will be presently more fully described. Also mounted upon the instrument panel 122 are two small bull's-eye signal lights 134, 135, which are conventionally wired in parallel with the heater element 102 and motor 96 to afford visual evidence of the fact that these elements are electrically operative whenever such is the case during the operation of the equipment. The circuitry by which these various electrical elements are interconnected is not a part of the present invention and, therefore, is not described in detail herein, it being merely sufficient to note that the electrical circuits are connected by a conventional extension cord 136 to a suitable source of electrical energy, preferably by means of a plug-in receptacle. In preparing the incubator A for use, the cap 118 is removed and water is poured through the transparent tube 117, flowing thence through the elbow 108 up into the compartment a of the pan 79. As soon as the level of water in the transparent tube 117 rises so as to be coincident with the upper graduation $G^1$ on the instrument panel 122, the water within the compartment a will have reached the desirable level and the heater element 102 will be approximately half immersed. If, during long periods of use, the water level within the compartment a drops, the level visible in the tube 117 will likewise drop and it is, therefore, immediately possible to refill the compartment a whenever necessary. When a period of use of the incubator A has terminated and it is necessary to empty any water which may remain within the compartment a, this can be very quickly and effectively accomplished merely by pulling the elbow 116 and its associated tube 114 outwardly in the direction of the arrow and rotating it 180° to the position shown in FIG. 14. Thereupon, the water which remains in the compartment a will flow downwardly and drain out, being caught in any suitable bucket or convenient basin.

When in use, the air within the infant compartment of the incubator will circulate continuously downwardly through the openings 15, 86, as previously described, and, thence, upwardly through the openings 14, 85, making a complete circuit and flowing across the top of the body of water in compartment a for effective humidification. It should be noted in this connection that the air flows over the surface of the water in the compartment a and, at the same time, flows through the upper portions of the heat-dissipating fins 103. Consequently, the heater 102 not only serves to heat the water in compartment a and produce humidifying evaporation thereof, but also adds an additional increment of "dry" heat to the air. By adjusting the water level within the compartment a, it is possible to have a greater or lesser amount of the heater 102 immersed and thereby maintain varying balances between humid heat and dry heat, so to speak. Ordinarily, this balance is not particularly critical where the premature infant is not particularly sensitive. There are, however, certain types of conditions which are encountered in premature infants where the heat-humidity balance must be very precisely maintained and this result can be effectively and conveniently obtained in the incubator A by the simple expedient of maintaining a predetermined water level within reasonably close limits. Inasmuch as the volume of the infant compartment in the incubator A is not particularly large and the incubator is air-tight to a substantial and practical degree, there is not too much loss of moisture. Consequently, the humidity can be maintained without an excessive amount of loss of evaporated water and the water level, once established in compartment a, does not vary too rapidly. For this reason, it is entirely feasible and possible to maintain a fairly precise heat-humidity balance by observing the water level in the transparent tube 117 at reasonable intervals during the day and replenishing the water whenever needed.

As will be seen by reference to FIG. 9, the tray 67 does not extend completely to the end of the recesses 10, 11, and, consequently, the air flow will travel upwardly and downwardly along the lateral side walls of the infant compartment created within the halfdomes 16, 37, and there will be a continuous and highly desirable air circuit thus established.

As will be seen by reference to FIG. 7, the incubator A can be readily opened up to insert or remove the infant or to make major changes in the infant's clothing or otherwise administer to its needs. For ordinary and recurring situations, such as the administration of medicine or feeding, the infant can be cared for without opening the halfdome 37, but, rather, by inserting the hands through the several apertures 21, 22, 44, 45. Since the springs 62, 63, are selected to supply a counterbalancing source equivalent to approximately 15 lbs., the weight of the tray 67, the mattress 72, and the infant, will be just about compensated for. Consequently, when the knob 56 is loosened, the tray 67 can be lifted up and down, without any danger of jarring the infant. The main electrical supply-line or extension cord 136 extends through a conventional grommet 137 set into the rear wall 2 of the base housing 1. Also rigidly mounted in the rear wall 2 of the base housing 1 are two knobs 138, 139, around which the extension cord 136 may be coiled when not in use. Finally, the side wall 3 is provided with a loop-forming flexible member 140 for holding a nebulizer bottle (not shown).

Preferably, though not necessarily, a bracket 141 is bolted or otherwise suitably secured in a convenient location upon the back wall 20 of the halfdome 16 for supporting a vertical plate 142, upon which conventional wet and dry bulb thermometers 143, 144, are supported. The wet and dry bulb thermometers, obviously, are conventional and, therefore, are merely shown in dotted lines and not particularly described herein.

It is also possible to provide a modified form of infant incubator A', shown in FIGS. 16 through 18, which is similar to the incubator A, previously described. Rockably and eccentrically mounted on the channel 76 by means of a pin 145 is a locking disk 146, and pivotally secured at one end to the locking disk 146 is an operating rod 147, the other end of which is integrally provided with opposed pin portions 148, 149. Pivotally secured to the pin portions 148, 149, is a U-shaped yoke 150 having a bight 151 tapped for reception of the threaded end 152 of a bolt 153, the latter projecting through the rear wall 2 and being supported by a tubular boss 154 welded to the rear wall 2. At its rear end the bolt 153 is provided with a knurled manipulating knob 155, and mounted on the bolt 153 inwardly of and adjacent the rear wall 2 is a collar 156 which is held in place by means of a set screw 157. Welded or otherwise secured to the channel 76 and forwardly of the locking disk 146 is a stop pin 158.

It will be apparent that, by manipulation of the knob 155, the locking disk 146 may be rocked forwardly so as to abut the stop pin 158, whereupon the pan 79 may be removed from the base housing 1. Upon insertion of the pan 79 within the housing 1, the knob 155 is manipulated, thereby rocking the locking disk 146 rearwardly to the position shown in FIGS. 16 and 17 so as to hold the pan 79 in tightly gasketed position beneath the top wall 5. By the use of two such locking assemblies in lieu of the thumb screws 89, 90, it is possible to remove and reinsert the pan 79 without the necessity of moving the tray 67 or disturbing any infant which may be resting on the pad 72.

It should be understood that changes and modifications in the form, construction, arrangement, and combination of the several parts of the incubators for infants may be made and substituted for those herein shown and described without departing from the nature and principle of our invention.

Having thus described our invention, what we claim and desire to secure by Letters Patent is:

1. An incubator comprising a base housing having a horizontal wall, a tray removably mounted on said wall, an elevating rod adapted to project through said wall and operatively connected to the underside of said tray adjacent one end thereof, spring biased means for urging said elevating rod upwardly so as to elevate said tray to any one of a plurality of selected angular positions, and locking means on one end of the elevating rod for locking the tray at any such selected position.

2. An incubator comprising a base housing having a horizontal wall, a tray removably mounted on said wall, an elevating rod adapted to project through said wall and operatively connected to the underside of said tray adjacent one end thereof, a fitting connected to one end of said elevating rod and being slidably mounted on said housing, spring biased means bearing against said fitting for urging said elevating rod upwardly, and a locking element associated with the slide fitting for restraining sliding movement of the fitting on the housing.

3. An incubator comprising a base housing having a horizontal wall, a tray removably mounted on said wall, an elevating rod adapted to project through said wall, said elevating rod being operatively connected to the underside of said tray adjacent one end thereof, a slide fitting connected to one end of said elevating rod and being slidably mounted on said housing, said fitting including a rotatable member, a spring actuated band trained around said rotatable member for urging said fitting and elevating rod upwardly, and a locking knob operatively associated with said slide fitting for restraining sliding movement of the fitting on the housing.

References Cited in the file of this patent

UNITED STATES PATENTS

| | | |
|---|---|---|
| 804,487 | Macarthy | Nov. 14, 1905 |
| 1,289,965 | Tichenor | Dec. 31, 1918 |
| 1,412,935 | Greenebaum | Apr. 18, 1922 |
| 1,688,200 | Morgenthaler | Oct. 16, 1928 |
| 1,843,514 | Levy | Feb. 2, 1932 |
| 1,947,007 | Hoffman | Feb. 13, 1934 |
| 2,243,999 | Chapple | June 3, 1941 |
| 2,292,120 | Hanby | Aug. 4, 1942 |
| 2,600,240 | Grieb | June 10, 1952 |
| 2,616,414 | McPherson | Nov. 4, 1952 |
| 2,624,333 | Dixon et al. | Jan. 6, 1953 |
| 2,633,842 | Higgs | Apr. 7, 1953 |
| 2,648,327 | Gibbon | Aug. 11, 1953 |
| 2,706,473 | Armstrong et al. | Apr. 19, 1955 |
| 2,708,927 | Dixon et al. | May 24, 1955 |
| 2,711,944 | Meek et al. | June 28, 1955 |
| 2,743,728 | Carlson | May 1, 1956 |
| 2,789,024 | Heisler | Apr. 16, 1957 |